United States Patent
Hull, Jr.

(10) Patent No.: US 8,372,921 B2
(45) Date of Patent: Feb. 12, 2013

(54) PROCESS FOR BROMINATING UNSATURATED ORGANIC COMPOUNDS USING A QUATERNARY PHOSPHONIUM TRIBROMIDE AS THE BROMINATING AGENT

(75) Inventor: John W. Hull, Jr., Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 13/057,255

(22) PCT Filed: Aug. 13, 2009

(86) PCT No.: PCT/US2009/053699
§ 371 (c)(1),
(2), (4) Date: Feb. 2, 2011

(87) PCT Pub. No.: WO2010/021906
PCT Pub. Date: Feb. 25, 2010

(65) Prior Publication Data
US 2011/0136984 A1    Jun. 9, 2011

Related U.S. Application Data

(60) Provisional application No. 61/090,954, filed on Aug. 22, 2008.

(51) Int. Cl.
*C08F 8/20* (2006.01)
*C08C 19/12* (2006.01)

(52) U.S. Cl. ............... 525/332.3; 525/332.9; 525/340; 525/356; 525/359.1

(58) Field of Classification Search .............. 525/332.3, 525/332.9, 340, 356, 359.1
See application file for complete search history.

(56) References Cited

U.S. PATENT DOCUMENTS

| | | | |
|---|---|---|---|
| 2008/0287559 A1 | 11/2008 | King et al. | |
| 2009/0008326 A1 | 1/2009 | Isaka et al. | |
| 2010/0004402 A1 | 1/2010 | King et al. | |
| 2010/0331497 A1* | 12/2010 | Vogel et al. | 525/451 |
| 2012/0016088 A1* | 1/2012 | Gorman et al. | 525/314 |

FOREIGN PATENT DOCUMENTS

| | | |
|---|---|---|
| WO | 2007058736 A | 5/2007 |
| WO | 2008021417 A | 2/2008 |
| WO | WO 2008/021417 A2 * | 2/2008 |

OTHER PUBLICATIONS

Hassanein et al., European Polymer Journal 25 (1989) 1083-1085.*
Hassanein et al., "Chemically Modified Poly(Methyl Methacrylate) Resin-Bound Triphenyl-phosphonium Bromide as Halogen-Carrier in the Bromination of Organic Compounds", Eur. Polym. J., vol. 25, pp. 1083-1085 (1989).

* cited by examiner

*Primary Examiner* — Roberto Rabago
(74) *Attorney, Agent, or Firm* — Gary C Cohn, PLLC

(57) ABSTRACT

Compounds or polymers that contain carbon-carbon unsaturation are brominated using a quaternary phosphonium tribromide as the brominating agent. The bromination process proceeds easily under mild conditions. The process can be highly selective. When the substrate is a butadiene polymer or copolymer, the brominated product tends to have excellent thermal stability.

7 Claims, No Drawings

PROCESS FOR BROMINATING UNSATURATED ORGANIC COMPOUNDS USING A QUATERNARY PHOSPHONIUM TRIBROMIDE AS THE BROMINATING AGENT

This application claims priority from U.S. Provisional Application No. 61/090,954, filed 22 Aug. 2008.

The present invention relates to a process for brominating organic compounds or polymers that have aliphatic carbon-carbon unsaturation.

Brominations are common industrial processes. These often involve adding bromine across a carbon-carbon double bond, removing the unsaturation and introducing bromine atoms onto each of the carbon atoms at the original site of the double bond. It is often necessary to use mild conditions in the bromination reaction. The starting material may have some functional group that can react in an unwanted way if conditions are too harsh. In other cases, it may be desired to brominate only a specific site out of many on the starting material that are susceptible to being brominated. Unwanted bromination may occur, for example on aromatic rings, or at tertiary or allylic carbon atoms. Mild conditions often are used to brominate at the desired site without causing unwanted reactions to occur and without introducing bromine into unwanted places. A good brominating agent in this situation should therefore provide for facile bromination under mild conditions.

Brominated butadiene polymers and copolymers are becoming of interest as flame retardant (FR) additives for various polymer systems. These are prepared by brominating a polybutadiene polymer or a copolymer of butadiene and a vinyl aromatic monomer such as styrene. An important attribute for these FR additives is thermal stability at thermoplastics processing temperatures. The FR additives should be thermally stable at temperatures in excess of 200° C. and preferably in excess of 240° C. Recent work such as is reported in WO 2008/021417 indicates that the way in which butadiene polymers are brominated can have a great effect on the thermal characteristics of the material. Unwanted bromination on aromatic rings or at tertiary or allylic carbon atoms will reduce the thermal stability of the brominated polymer, as will other impurities that can be introduced during the bromination reaction. A good bromination process produces a brominated butadiene polymer in which a very high proportion (85% or more) of the carbon-carbon double bonds are brominated, in which little or no bromination occurs on any aromatic rings or tertiary or allylic carbon atoms as may be present; and in which few other impurities are introduced into the brominated polymer. In the process described in WO 2008/021417, the brominating agent is one of a class of quaternary ammonium compounds. These brominating agents produce brominated butadiene polymers that are highly thermally stable, but the bromination reaction tends to slow considerably once 50 to 75% of the aliphatic carbon-carbon unsaturation sites have been brominated.

What is desired is a bromination process which is effective for a range of bromination reactions. The bromination process preferably is capable of selectively brominating aliphatic carbon-carbon unsaturation under only mild conditions.

This invention is a process for brominating an organic compound or polymer that contains carbon-carbon unsaturation. The process comprises contacting at least one quaternary phosphonium tribromide with at least one organic compound or polymer that contains carbon-carbon unsaturation, under conditions such that at least one site of carbon-carbon unsaturation on the organic compound or polymer is brominated.

This bromination process provides facile and rapid bromination, in many cases under only mild conditions. By "bromination", it is meant that two bromine atoms are introduced at the site of the carbon-carbon unsaturation, one on each of the carbon atoms.

Under mild conditions, the bromination process provides excellent selectively towards bromination of aliphatic carbon-carbon double bonds. There is usually little or no hydrobromination, i.e., the addition of one hydrogen atom and one bromine atom across the unsaturated site, when conditions are mild. The invention also lends itself easily to continuous or semi-continuous operation.

Harsher conditions can be used if selectively is not necessary, or to brominate less reactive sites of carbon-carbon unsaturation such as aromatic rings.

When used to brominate a butadiene polymer or polymer, the process brominates both 1,2- and 1,4-butadiene repeating units, again under mild conditions. Under mild conditions, little or no bromination of aromatic rings or tertiary carbon atoms is seen and other impurities are generally present only in small amounts. As a result, the brominated butadiene polymers and copolymers, especially butadiene/vinyl aromatic copolymers, tend to exhibit excellent thermal stability, as indicated by a thermal gravimetric analysis (TGA) method described below. Brominated butadiene polymers and copolymers made in accordance with the invention often exhibit 5% weight loss temperatures, determined according to the TGA method described below, of above 200° C., more typically above 230° C., often above 240° C. and in some cases 250° C. or more.

The starting organic compound or polymer is sometimes referred to herein as the "substrate". The substrate has at least one site of carbon-carbon unsaturation, by which is meant a carbon-carbon double or triple bond, which may or may not form part of a conjugated system or aromatic ring structure. A preferred substrate contains one or more sites of aliphatic carbon-carbon unsaturation. By "aliphatic carbon-carbon unsaturation", it is meant a site in which adjacent carbon atoms are double or triply bonded to each other, and those double or triple bonds do not from part of a conjugated system or aromatic ring structure. The substrate that contains aliphatic carbon-carbon unsaturation also may contain one or more aromatic rings and may contain one or more tertiary carbon atoms. A "tertiary" carbon atom, for purposes of this invention, is a carbon atom which is bonded to exactly one hydrogen atom and to three other carbon atoms. A substrate containing an aliphatic carbon-carbon unsaturation and an aromatic ring and/or a tertiary carbon atom often can be selectively brominated at the site(s) of aliphatic carbon-carbon unsaturation while brominating only a small amount, if any, of the aromatic ring(s) or the tertiary or allylic carbon atoms, when mild conditions are used.

Polymers and copolymers of butadiene are a preferred class of substrates. A butadiene copolymer should contain at least 10% by weight of polymerized butadiene. A copolymer can be a random, block or graft type. A copolymer will contain repeating units formed by polymerizing another monomer. Such other monomers include vinyl aromatic monomers as described more fully below, olefins such as ethylene and propylene, and acrylate or acrylic monomers such as methyl methacrylate, methyl acrylate, acrylic acid, and the like. These monomers may be randomly polymerized with the butadiene, may be polymerized to form blocks, or may be grafted onto a butadiene polymer.

The butadiene polymer or copolymer may have a weight average molecular weight ($M_w$) within a range of from 1,000 to 400,000, preferably from 5,000 to 300,000, more preferably from 10,000 to 200,000 and even more preferably from 50,000 to 175,000. For purposes of this invention, molecular weights are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, or equivalent device, with tetrahydrofuran (THF) flowing at a rate of 1 mL/min and heated to a temperature of 35° C. as the eluent.

Butadiene polymerizes to form mainly two types of repeating units. One type, referred to herein as "1,2-butadiene units" takes the form

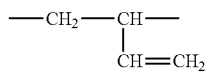

and so introduce pendant unsaturated groups to the polymer. The second type, referred to herein as "1,4-butadiene" units, take the form —CH$_2$—CH=CH—CH$_2$—, and introduce unsaturation into the main polymer chain. The butadiene/vinyl aromatic polymer contains at least some 1,2-butadiene units. Of the butadiene units in the butadiene/vinyl aromatic polymer, at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the butadiene/vinyl aromatic copolymer. The proportion of 1,2-butadiene units may be in excess of 85% or even in excess of 90% of the butadiene units in the copolymer.

Methods for preparing butadiene/vinyl aromatic polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci.* A-2, 9, 43-57 (1971), J. Zymona, E. Santte and H. Harwood in *Macromolecules*, 6, 129-133 (1973), and H. Ashitaka, et al., in *J. Polym. Sci., Polym. Chem.*, 21, 1853-1860 (1983).

The substrate of particular interest is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as, for example alpha-methylstyrene), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

"Vinyl aromatic units" refers to repeating units in the starting material that are formed when a vinyl aromatic monomer is polymerized. A suitable starting butadiene/vinyl aromatic copolymer contains from 5 to 90 percent by weight of polymerized vinyl aromatic monomer units.

The butadiene/vinyl aromatic copolymer may be a random, block (including multiblock such as diblock or triblock types) or graft type of copolymer. Styrene/butadiene block copolymers are widely available in commercial quantities. Those available from Dexco Polymers under the trade designation VECTOR™ are suitable. Styrene/butadiene random copolymers may be prepared in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

The butadiene/vinyl aromatic polymer may also contain repeating units formed by polymerizing monomers other than butadiene and the vinyl aromatic monomer, such as those described above.

The most preferred type of butadiene/vinyl aromatic copolymer is a block copolymer containing one or more polystyrene blocks and one or more polybutadiene blocks. Among these, diblock copolymers, and triblock copolymers having a central polybutadiene block and terminal polystyrene blocks, are especially preferred.

If the substrate is a liquid under the conditions of the bromination reaction, and the quaternary phosphonium tribromide is sufficiently miscible in the substrate, the bromination reaction can be conducted neat. However, in most cases it will be preferred to conduct the reaction in the presence of a solvent or diluent. The solvent should be a solvent for the substrate and preferably for the quaternary phosphonium tribromide as well. The brominated product and the quaternary phosphonium monobromide by-product which forms during the reaction may or may not be soluble in the solvent. As discussed below, some process advantages may accrue if either or both of these materials are insoluble in the process solvent. Suitable solvents include ethers such as tetrahydrofuran; various carboxylic acid esters, halogenated alkanes such as carbon tetrachloride, chloroform, dichloromethane, bromochloromethane, dibromomethane, 1,2-dibromoethane and 1,2-dichloroethane; hydrocarbons such as heptane, octane, decane, dodecane, cyclohexane, cyclopentane, cyclooctane and toluene, and halogenated aromatic compounds such as bromobenzene, chlorobenzene and dichlorobenzene. Preferred solvents have boiling temperatures (at atmospheric pressure) of less than 100° C. (especially less than 80° C.), are substantially immiscible in water, are aprotic, and do not contain hydrogen atoms bonded to a tertiary carbon atom. It has been found that halogen exchange reactions do not occur to a significant extent when mild reaction conditions are used, and for that reason chlorinated solvents are very suitable for use in the invention. Halogenated alkanes, cyclic alkanes that contain no hydrogen atoms bonded to a tertiary carbon atom and halogenated aromatic compounds are particularly preferred solvents. Especially preferred solvents are more volatile than water, and are thus easily removed from water. Three especially preferred solvents are dichloroethane, dichloromethane and cyclohexane.

The brominating agent is a quaternary phosphonium tribromide. The quaternary phosphonium tribromide has a quaternary phosphonium group that can be represented by the formula R$_4$P$^+$, where each R is a hydrocarbon group. The quaternary phosphonium tribromide may be a tetraalkylphosphonium tribromide, in which case each of the R groups is alkyl. The four R groups can all be the same. Alternatively, there may two, three or even four different R groups attached to the phosphorus atom. The R groups each are preferably alkyl having from one to 20 carbon atoms. The R groups more preferably are alkyl groups having from 1 to 8 carbon atoms. Examples of specific quaternary phosphonium tribromides include tetramethylphosphonium tribromide, tetraethylphosphonium tribromide, tetra(n-propyl)phosphonium tribromide, tetra(n-butyl)phosphonium tribromide, tetrahexylphosphonium tribromide, tetraoctylphosphonium tribromide, tri(hexyl)tetradecyl phosphonium tribromide and the like, or mixtures thereof.

The tribromide brominating agent can be prepared by mixing the corresponding quaternary phosphonium monobromide salt with elemental bromine. The monobromide salt is usually water-soluble, so a convenient way of making the tribromide is to add elemental bromine to an aqueous solution of the monobromide salt. This reaction occurs well at approximately room temperature, but higher or lower temperatures can be used if desired. The tribromide tends to be relatively insoluble in the aqueous phase and therefore usually will precipitate from it, and therefore may be recovered from the liquid phase by any convenient solid-liquid separation method. The tribromide can alternatively be recovered from the aqueous phase by extracting it with an organic solvent such as those described below. The tribromide may be dissolved in such a solvent if desired to facilitate blending with the substrate.

The reaction is conducted by mixing the substrate, quaternary phosphonium tribromide and solvent (if any) together and allowing the mixture to react until the aliphatic carbon-carbon unsaturation sites have been brominated. The order of addition is not especially important, except that if the tribromide and butadiene/vinyl aromatic copolymer are mixed first, it is preferred to add any solvent before significant reaction occurs.

When used, enough of the solvent is present to dissolve the substrate under the conditions of the reaction. If necessary, additional amounts of solvent can be used to reduce the viscosity of the reaction mixture, or to act as a diluent. The concentration of the substrate in the solvent may range from, for example, 1 to 50% by weight, especially from 5 to 35% by weight.

About 0.5 to about 5 moles of the quaternary phosphonium tribromide brominating agent are suitably used per mole of carbon-carbon unsaturation that is to be brominated; a more suitable amount is from about 0.9 to about 2.5 moles/mole and an even more suitable amount is from 1 to 1.5 moles/mole.

Bromination temperatures can range from −20 to 100° C., and are preferably from 0 to 85° C. and especially from 10 to 40° C. Generally, a bromination temperature of 40° C. or below is considered to constitute "mild" conditions for purposes of this invention, and is preferred when selectivity and avoidance of by-product formation are wanted. Harsher conditions, such as a temperature of greater than 40° C., can be used and may be necessary to brominate less reactive sites of unsaturation such as aromatic rings. Higher bromination temperatures may lead to a loss of selectivity and/or an increase in by-products.

In some embodiments, the quaternary phosphonium monobromide salt is affixed to a solid support, and the tribromide is generated at the surface of the support. The substrate in these cases is passed in contact with the support under reaction conditions to effect the bromination.

The bromination tends to be completed in a matter of minutes or hours in most cases. The tribromide becomes converted to the corresponding quaternary phosphonium monobromide salt as the reaction proceeds.

If the substrate has multiple sites of aliphatic carbon-carbon unsaturation (as is the case with the preferred butadiene polymers and copolymers), it is possible to conduct the reaction so that only a portion of the unsaturated sites become brominated.

For example, the bromination of a butadiene polymer or copolymer may be continued until at least 50% of the butadiene units have been brominated. More preferably, at least 85% of the butadiene units are brominated. Preferably up to 99% of those butadiene units are brominated, and up to 100% of them can be brominated. Residual aliphatic carbon-carbon double bonds in a brominated butadiene polymer can lead to undesirable cross-linking reactions, particularly when the brominated copolymer is blended with another polymer (such as a polyvinyl aromatic polymer) for manufacture of extruded articles (for example, foam, film, fiber, moldings etc.). The crosslinking may lead to gel formation and fouling of processing equipment. The presence of gels may lead to impaired physical properties, blemished surface or optical properties, or increased color formation. Gels may affect the ability to melt-process the blends, particularly when the blends are foamed.

The extent of bromination of the substrate such as a butadiene polymer or copolymer can be determined using proton NMR methods. For example, residual double bond percentage, polymerized styrene monomer content and 1,2 isomer content for a brominated butadiene/styrene copolymer can be determined by comparing integrated areas of signals due to appropriate protons (residual double bond protons are between 4.8 and 6 ppm) (relative to tetramethylsilane (TMS)), styrene aromatic protons are between 6.2-7.6 ppm, and protons for brominated polybutadiene are between 3.0 and 4.8 ppm. A Varian INOVA™ 300 NMR spectrometer or equivalent device is useful for such determinations, being operated with a delay time of 30 seconds to maximize relaxation of protons for quantitative integrations. A deutero-substituted solvent such as deutero-chloroform or $d_5$-pyridine is suitable for diluting the sample for NMR analysis.

When conducted under mild conditions, the bromination reaction tends to be highly selective, in several respects. Little or no bromination occurs on aromatic rings that may be present on the substrate. It is believed that the bromination occurs through an ionic mechanism, rather than a free radical mechanism that can introduce unwanted bromine at tertiary carbon atoms. These tertiary bromines are believed to adversely affect the temperature stability of brominated butadiene polymers and copolymers. In addition, little hydrobromination, i.e., the addition of HBr across a carbon-carbon double bond, is seen. In butadiene polymers and copolymers, bromination tends to take place at the carbon-carbon double bonds of both 1,2- and 1,4-butadiene units, with little or no bromination taking place at tertiary or allylic carbon atoms. In many cases, such as when the process is used to brominate a polymer or copolymer of butadiene, it is preferred that no more than 10%, more preferably no more than 5% of the bromination takes place at allylic or tertiary carbon atoms.

The bromination rate may tend to decrease in the later stages of the reaction, when the substrate is one like a butadiene polymer or copolymer, which contains multiple sites of aliphatic carbon-carbon unsaturation. This is especially the case when a high conversion is wanted. One way to help maintain the reaction rates in the later stages of the reaction is to add to the reaction mixture a solvent for the quaternary phosphonium monobromide by-product. This is done after a portion of the aliphatic carbon-carbon unsaturation sites have been brominated. The remainder of the bromination reaction is then conducted in the presence of this solvent for the quaternary phosphonium monobromide salt. The benefit of adding a solvent for the quaternary phosphonium monobromide is best seen when that solvent is added after at least 25%, but before 90%, of the aliphatic carbon-carbon unsaturation site have been brominated. Preferably, the solvent for the monobromide is added after 50%, more preferably at least 60%, up to 80%, more preferably up to 75%, of the aliphatic carbon-carbon unsaturation sites have been brominated. The solvent should not be a strong solvent for the brominated substrate or the quaternary phosphonium tribromide, so that the monobromide salt but not the brominated substrate or the tribromide partitions strongly into this solvent. This solvent is preferably water or an aqueous phase containing at least 50% by weight of water.

Alternatively, a substrate having multiple aliphatic carbon-carbon unsaturation (such as a butadiene polymer or copolymer) may be only partially brominated with the quaternary phosphonium tribromide, and the remainder of the bromination performed using elemental bromine as the brominating agent. In such embodiments, the bromination with the phosphonium tribromide proceeds until from 50 to 95% of the aliphatic carbon-carbon unsaturation has been brominated. The partially brominated substrate is then contacted with elemental bromine, in the absence of the quaternary phosphonium tribromide or monobromide salt, until the desired proportion of the aliphatic carbon-carbon unsaturation sites has been brominated. For butadiene polymers and copolymers, it is preferred in this case to continue brominating with elemental bromine until at least 96% of the sites have been brominated. The second part of the bromination reaction may be conducted in the presence of an aliphatic alcohol such as a $C_{1-6}$ alkanol. This process provides rapid reaction rates and short reaction times to obtain very high conversions, while producing few impurities. It can produce a brominated butadiene polymer that has a very high 5% weight loss temperature.

In certain embodiments of the invention, the quaternary phosphonium tribromide is formed in situ, i.e., in the presence of the substrate, by separately adding elemental bromine and the corresponding quaternary phosphonium monobromide salt to the substrate or solution of the substrate. This process has the advantage of using less of the expensive quaternary phosphonium monobromide compound that serves to carry the bromine added to the polymer and is preferred. It is believed that the bromine and monobromide salt form the tribromide upon being mixed together, with the resulting tribromide then reacting with the substrate to brominate the substrate and regenerate the monobromide salt. As elemental bromine is consumed in this reaction sequence, more bromine may be added to the reaction mixture continuously or intermittently to reproduce the tribromide and maintain the reaction. In this variation of the process, a relatively small quantity of the quaternary phosphonium tribromide is present in the reaction mixture at any given point in time. This amount may be as little as 0.01 mole of the quaternary phosphonium tribromide per mole of carbon-carbon unsaturation that is to be brominated. A preferred amount is at least 0.05 moles/mole, and a more preferred amount is at least 0.1 moles/mole, up to 0.8 moles/mole and more preferably up to 0.5 moles/mole.

The ability to form the quaternary phosphonium tribromide in situ lends itself to the operation of a continuous or semi-continuous process, in which elemental bromine is fed into a reaction mixture continuously or in any number of stages, as the tribromide is consumed in the reaction and the monobromide salt is regenerated. The elemental bromine combines with the regenerated monobromide salt to re-form the tribromide.

In an embodiment of a continuous process, a starting butadiene polymer is brominated using the quaternary phosphonium tribromide, in the presence of a solvent which is a good solvent for the tribromide and the starting butadiene polymer but which is not a good solvent for the quaternary phosphonium monobromide salt that is produced as a by-product. A solution or slurry of the brominated butadiene polymer forms, which also contains the quaternary phosphonium monobromide salt. This solution or slurry is extracted with an aqueous phase containing a reducing agent. An aqueous stream containing the quaternary phosphonium monobromide salt forms, and the brominated butadiene polymer remains with the process solvent. The aqueous quaternary phosphonium monobromide stream is then contacted with elemental bromine and a stream of the process solvent. The bromine and monobromide salt react to regenerate the quaternary phosphonium tribromide, which partitions back into the process solvent. The quaternary phosphonium tribromide solution is then recycled back into the reaction step.

In other embodiments, the process solvent is chosen so that the quaternary phosphonium monobromide salt is soluble in it, but the brominated substrate is insoluble or only slightly soluble. In such a case, conditions can be selected such that the brominated product precipitates as it is formed while the monobromide salt remains in solution. Under such conditions, fresh substrate can be continuously or intermittently introduced to the reaction zone as the brominated product precipitates. The fresh substrate and elemental bromine are added continuously or intermittently to a reaction zone that contains solvent and the quaternary phosphonium monobromide salt, and the brominated product either precipitates from the reaction mixture, or is otherwise continuously or intermittently removed therefrom. In these cases, the precipitated brominated product is easily removed from the reaction mixture by solid/liquid separation methods such as decantation, filtration or centrifugation.

After the bromination is completed, the brominated product is recovered from the process solution (if a solvent is used in the process). If the brominated product is insoluble in the process solvent, it can be recovered by solid/liquid separation methods as mentioned before. Residual process solvent can be removed from the polymer by stripping or drying methods.

If the brominated product is soluble in the reaction mixture, it can be isolated from the mixture via various solvent stripping methods, by extraction methods, or by precipitating it from the solution using an anti-solvent. Examples of such anti-solvents include lower alcohols such as methanol, ethanol and 1-propanol, 2-propanol, n-butanol, and t-butanol.

In one suitable recovery method, the solution is formed into fine droplets. The solvent is thermally stripped from the droplets to form particles of the brominated product. Before or after the thermal stripping step, the droplets or particles are washed in water. In another suitable recovery method, the solution is formed into droplets and sprayed onto a heated, mechanically agitated bed of seed particles. The droplets contact the seed particles, where the solvent is driven off and the precipitated brominated product forms a shell around the individual seed particles, thereby increasing their diameter. This last process permits particles of a desired size to be formed. Both of the processes described in this paragraph are especially suitable for recovering a brominated butadiene polymer from the process solvent.

The isolated product may be purified to remove residual bromine, brominating agent, solvent and by-products as desired or needed for a particular application. Bromide salts may be removed by passing the product through silica gel or an ion exchange resin bed. The product may be washed with an aqueous sodium hydrogen sulfite solution to neutralize or quench unreacted brominating agent that may be present. This effectively removes or eliminates any orange color that may be present in the product due to residual bromine or bromine compounds.

The preferred substrate is a butadiene polymer or copolymer. In those cases, the process of the invention tends to produce brominated butadiene polymers or copolymers that have excellent thermal stability. A useful indicator of thermal stability is a 5% weight loss temperature, which is measured by thermogravimetric analysis as follows: 10 milligrams of the polymer is analyzed using a TA Instruments model Hi-Res TGA 2950 or equivalent device, with a 60 milliliters per minute (mL/min) flow of gaseous nitrogen and a heating rate of 10° C./min over a range of from room temperature (nominally 25° C.) to 600° C. The mass lost by the sample is monitored during the heating step, and the temperature at which the sample has lost 5% of its initial weight is designated the 5% weight loss temperature (5% WLT). Weight losses that occur at 100° C. or below are disregarded in this measurement. This method provides a temperature at which a sample undergoes a cumulative weight loss of 5 wt %, based on initial sample weight less materials that volatilize at 100° C. or below. The brominated butadiene polymer or copolymer preferably exhibits a 5% WLT of at least 200° C. The 5% WLT is preferably at least 220° C., more preferably at least 230° C., even more preferably at least 240° C., and still more preferably at least 250° C. Brominated butadiene polymer or copolymers in which at least 85% of the butadiene units have been brominated, and which have such 5% WLT values, are of particular interest.

A further increase in thermal stability is sometimes seen if the brominated copolymer is treated with an alkali metal base as described in WO 08/021,417.

A brominated butadiene polymer or copolymer produced in accordance with the invention is useful as a flame retardant additive for a variety of organic polymers. Organic polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other organic polymers in which the brominated copolymer is soluble or can be dispersed to form domains of less than 10 µm, preferably less than 5 µm, in size. Enough of the brominated polymer or polymer is preferably present in the blend to provide the blend with a bromine content within a range of from 0.1 percent by weight to 25 percent by weight, based upon blend weight.

Blends of the brominated polymer or copolymer may include other additives such as other flame retardant additives, flame retardant adjuvants, thermal stabilizers, ultraviolet light stabilizers, nucleating agents, antioxidants, foaming agents, acid scavengers and coloring agents.

The following example is provided to illustrate the invention, but not to limit the scope thereof. All parts and percentages are by weight unless otherwise indicated.

EXAMPLE 1

5 g (0.056 mole of butadiene units) of a styrene-butadiene triblock copolymer is mixed into 100 mL of chlorobenzene. The triblock copolymer contains terminal polystyrene blocks that each constitutes 20% by weight of the block copolymer, and a central polybutadiene block constituting 60% by weight of the block copolymer. 22.6 g (0.067 mole) of tetrabutylphosphonium monobromide salt and 3 mL (0.059 mole) of bromine are separately mixed in 100 mL of chlorobenzene. The two solutions above are combined together and stirred for 24 hours at 40° C., cooled to ambient temperature and stirred for an additional 72 hours. The resulting solution is then washed sequentially with two 100 mL portions of water, then with 100 mL of a sodium hydrogen sulfite solution, and then finally with 100 mL of water. The volume of the organic phase is reduced by about 50% on a rotary evaporator, and the organic phase is then added dropwise to 300 mL of stirring isopropanol to precipitate the brominated polymer. Solids are collected by filtration, rinsed with isopropanol and dried overnight under vacuum at 65° C. 11.8 grams of brominated butadiene polymer are obtained. The polymer contains 60.8% total bromine by neutron activation analysis. 88% of the starting aliphatic carbon-carbon unsaturation has been brominated. Free bromide is 9.1 ppm and the 5% WLT is 252° C.

What is claimed is:

1. A process for brominating a butadiene polymer or copolymer containing at least 10% by weight polymerized butadiene, comprising contacting at least one quaternary phosphonium tribromide and the butadiene polymer or copolymer under conditions such that at least 50% of the butadiene units of the butadiene polymer or copolymer become brominated.

2. The process of claim 1, which is conducted in the presence of a solvent for the butadiene polymer or copolymer.

3. The process of claim 1, wherein the quaternary phosphonium tribromide is a tetraalkylphosphonium tribromide.

4. The process of claim 3, wherein the tetraalkylphosphonium tribromide is tetramethylphosphonium tribromide, tetraethylphosphonium tribromide, tetra(n-propyl)phosphonium tribromide, tetra(n-butyl)phosphonium tribromide, tetrahexylphosphonium tribromide, tetraoctylphosphonium tribromide, tri(hexyl)tetradecyl phosphonium tribromide, or a mixture of any two or more thereof.

5. The process of claim 1, wherein the butadiene polymer or copolymer is a block copolymer containing one or more polystyrene blocks and one or more polybutadiene blocks.

6. The process of claim 5, wherein the quaternary phosphonium tribromide is a tetraalkylphosphonium tribromide.

7. The process of claim 6 wherein the tetraalkylphosphonium tribromide is tetramethylphosphonium tribromide, tetraethylphosphonium tribromide, tetra(n-propyl)phosphonium tribromide, tetra(n-butyl)phosphonium tribromide, tetrahexylphosphonium tribromide, tetraoctylphosphonium tribromide, tri(hexyl)tetradecyl phosphonium tribromide, or a mixture of any two or more thereof.

* * * * *